US012202274B2

(12) United States Patent
Kondo et al.

(10) Patent No.: US 12,202,274 B2
(45) Date of Patent: Jan. 21, 2025

(54) PRINTING DEVICE

(71) Applicant: Brother Kogyo Kabushiki Kaisha, Nagoya (JP)

(72) Inventors: Kei Kondo, Aichi (JP); Yasutoshi Kano, Kariya (JP); Kazuma Hojo, Inazawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 171 days.

(21) Appl. No.: 18/162,098

(22) Filed: Jan. 31, 2023

(65) Prior Publication Data

US 2023/0173823 A1 Jun. 8, 2023

Related U.S. Application Data

(63) Continuation of application No. PCT/JP2021/012878, filed on Mar. 26, 2021.

(30) Foreign Application Priority Data

Jul. 31, 2020 (JP) ................................ 2020-131203

(51) Int. Cl.
*B41J 23/12* (2006.01)
*B41J 2/325* (2006.01)
(Continued)

(52) U.S. Cl.
CPC ............... *B41J 2/325* (2013.01); *B41J 23/12* (2013.01); *B41J 29/02* (2013.01); *B41J 35/28* (2013.01)

(58) Field of Classification Search
CPC ..... B41J 2/32; B41J 2/325; B41J 23/12; B41J 25/34; B41J 29/02; B41J 235/28; B41J 2202/31
See application file for complete search history.

(56) References Cited

U.S. PATENT DOCUMENTS

| | | | | |
|---|---|---|---|---|
| 5,538,351 | A * | 7/1996 | Miyano | B41J 32/00 347/171 |
| 10,086,632 | B1 | 10/2018 | Kondo | |
| 2013/0271548 | A1 | 10/2013 | Morgan et al. | |

FOREIGN PATENT DOCUMENTS

| | | | |
|---|---|---|---|
| JP | H03-264378 | A | 11/1991 |
| JP | 2004-508974 | A | 3/2004 |

(Continued)

OTHER PUBLICATIONS

Jan. 31, 2023—International Preliminary Report on Patentability and Written Opinion—Intl App PCT/JP2021/012878, Eng Tran.

(Continued)

*Primary Examiner* — Anh T Vo
(74) *Attorney, Agent, or Firm* — Banner & Witcoff, Ltd.

(57) ABSTRACT

A printing device includes a thermal head, a rotation shaft extending in an axial direction and rotatably supported, a pivot member connected to the rotation shaft and configured to pivot integrally with the rotation shaft about the rotation shaft, a biasing unit configured to bias the thermal head upward, a first pivot shaft supported by the pivot member, extending parallel to the axial direction, located below the rotation shaft, and configured to pivot integrally with the pivot member about the rotation shaft, a support member supported by the first pivot shaft to be movable along the first pivot shaft and to be pivotable about the first pivot shaft, the support member including a lower end portion located below the rotation shaft, and a pressing portion provided on the lower end portion of the support member and configured to press the thermal head downward.

8 Claims, 11 Drawing Sheets

(51) Int. Cl.
*B41J 29/02* (2006.01)
*B41J 35/28* (2006.01)

(56) References Cited

FOREIGN PATENT DOCUMENTS

| | | | |
|---|---|---|---|
| JP | 2018-202667 | A | 12/2018 |
| WO | 02-22371 | A2 | 3/2002 |

OTHER PUBLICATIONS

Jun. 3, 2024—(EP) Extended EP Search Report—EP App. 21849933.3.

Jun. 1, 2021—International Search Report—Intl App PCT/JP2021/012878.

* cited by examiner

PRINTING DEVICE

REFERENCE TO RELATED APPLICATIONS

This is a continuation application of International Application No. PCT/JP2021/012878 filed on Mar. 26, 2021 which claims priority from Japanese Patent Application No. 2020-131203 filed on Jul. 31, 2020. The entire contents of the earlier applications are incorporated herein by reference.

BACKGROUND ART

A related art discloses a printing device including a thermal head, a head pressing mechanism, and a head moving mechanism. The thermal head is supported by a holding member. The head pressing mechanism includes a rotation shaft, a transmission member, a roller, a drive portion, and the like. The rotation shaft extending in a left-right direction is rotatable about an axis of the rotation shaft. The transmission member is provided at both ends of the rotation shaft in the left-right direction. The transmission member pivots about the rotation shaft by a driving force of the drive portion. The roller is fixed to a front side of the transmission member. The roller moves downward due to the pivoting of the transmission member to press the thermal head downward from above. The head moving mechanism includes a linear bush. The linear bush is connected to the thermal head. As the linear bush slides on the rotation shaft, the thermal head moves in the left-right direction.

DESCRIPTION

In the above printing device, the linear bush connected to the thermal head moves on the rotation shaft, and thus a movable range of the thermal head in the left-right direction is limited to a range between both end portions of the rotation shaft where the transmission member is disposed. Therefore, there is a possibility that the printing device cannot increase the movable range of the thermal head.

An object of the present disclosure is to provide a printing device capable of increasing a movable range of a thermal head.

A printing device according to the present disclosure includes: a thermal head; a rotation shaft extending in an axial direction and rotatably supported; a rotation drive portion configured to rotate the rotation shaft; a pivot member connected to the rotation shaft and configured to pivot integrally with the rotation shaft about the rotation shaft; a first support portion configured to support the thermal head to be movable in an up-down direction intersecting the axial direction; a second support portion configured to support the first support portion to be movable parallel to the axial direction; a biasing unit configured to bias the thermal head upward; a first pivot shaft supported by the pivot member, extending parallel to the axial direction, located below the rotation shaft, and configured to pivot integrally with the pivot member about the rotation shaft; a support member supported by the first pivot shaft to be movable along the first pivot shaft and to be pivotable about the first pivot shaft, the support member including an upper end portion located above the rotation shaft, a lower end portion located below the rotation shaft, and an intermediate portion located between the upper end portion and the lower end portion; a pressing portion provided on the lower end portion of the support member and configured to press the thermal head downward; and a movement drive portion configured to move the first support portion in the axial direction.

In the printing device, the rotation shaft and a first rotation shaft are separately provided. Therefore, the printing device can move the thermal head without limiting a movable range of the thermal head in the axial direction, as compared with a case where the thermal head is provided on the rotation shaft, moves in the axial direction on the rotation shaft, and is pressed downward by rotation of the rotation shaft. Therefore, the printing device can increase a movable range of the thermal head.

A printing device according to the present disclosure includes: a thermal head; a rotation shaft extending in an axial direction and supported rotatably around an axis of the rotation shaft; a rotation drive portion configured to rotate the rotation shaft; a pivot member connected to the rotation shaft and configured to pivot integrally with the rotation shaft about the rotation shaft; a first support portion configured to support the thermal head to be movable on one side in an intersecting direction with respect to the pivot member, the intersecting direction intersecting with the axial direction; a second support portion configured to support the first support portion to be movable parallel to the axial direction; a biasing unit configured to bias the thermal head to an other side in the intersecting direction; a first pivot shaft supported by the pivot member, extending parallel to the axial direction, located on the one side in the intersecting direction than the rotation shaft, and configured to pivot integrally with the pivot member about the rotation shaft; a support member supported to be movable along the first pivot shaft and to be pivotable about the first pivot shaft, the support member including a first end portion located on the other side in the intersecting direction than the rotation shaft, a second end portion located on the one side than the rotation shaft, and an intermediate portion located between the first end portion and the second end portion; a pressing portion provided on the second end portion of the support member and configured to press the thermal head toward the one side in the intersecting direction; and a movement drive portion configured to move the first support portion in the axial direction.

In the printing device, the rotation shaft and the first pivot shaft are separately provided. Therefore, the printing device can move the thermal head without limiting a movable range of the thermal head in the axial direction, as compared with a case where the thermal head is provided on the rotation shaft, moves in the axial direction on the rotation shaft, and is pressed downward due rotation of the rotation shaft. Therefore, the printing device can increase a movable range of the thermal head.

Figure 1:
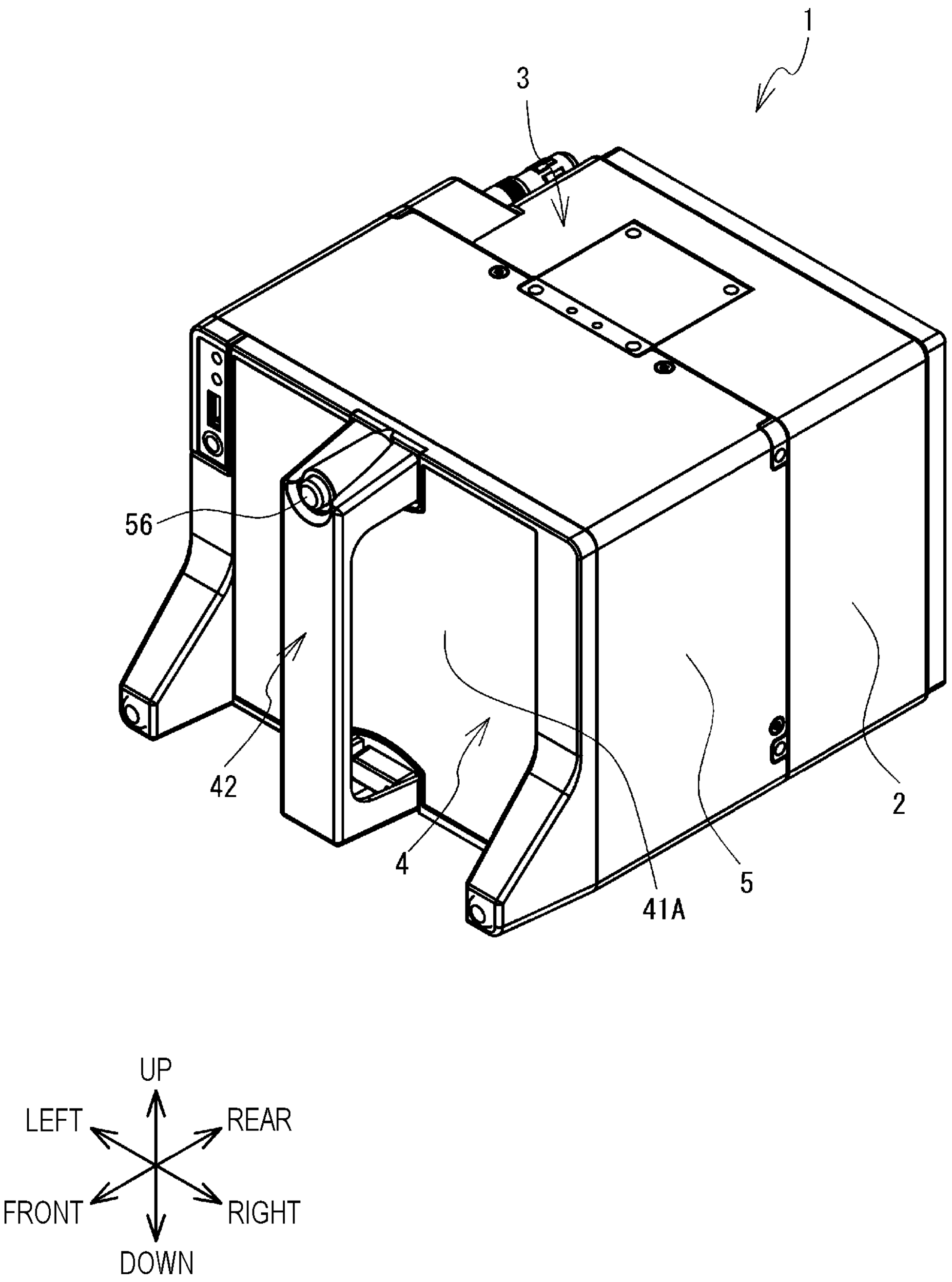
FIG. 1 is a perspective view of a printing device 1.

A printing device 1 according to the present disclosure will be described with reference to the drawings. In the following description, left and right, front and rear, and up and down indicated by arrows in the drawings are used.

The printing device 1 shown in FIG. 1 is a thermal transfer printing device. The printing device 1 performs printing on a printing medium conveyed by an external device that is not shown. An example of the external device is a packaging machine that conveys a packaging material. For example, the printing device 1 is incorporated in a conveyance line along which the packaging material is conveyed by a platen of the packaging machine. A cassette 4 that supports an ink ribbon that is not shown is mounted to the printing device 1. The printing device 1 feeds out the ink ribbon from the mounted cassette 4. The printing is performed on the packaging material by heating the ink ribbon with a plurality of heating elements linearly arranged in a front-rear direction of a thermal head 39 (see FIGS. 2 and 3).

Figure 3:
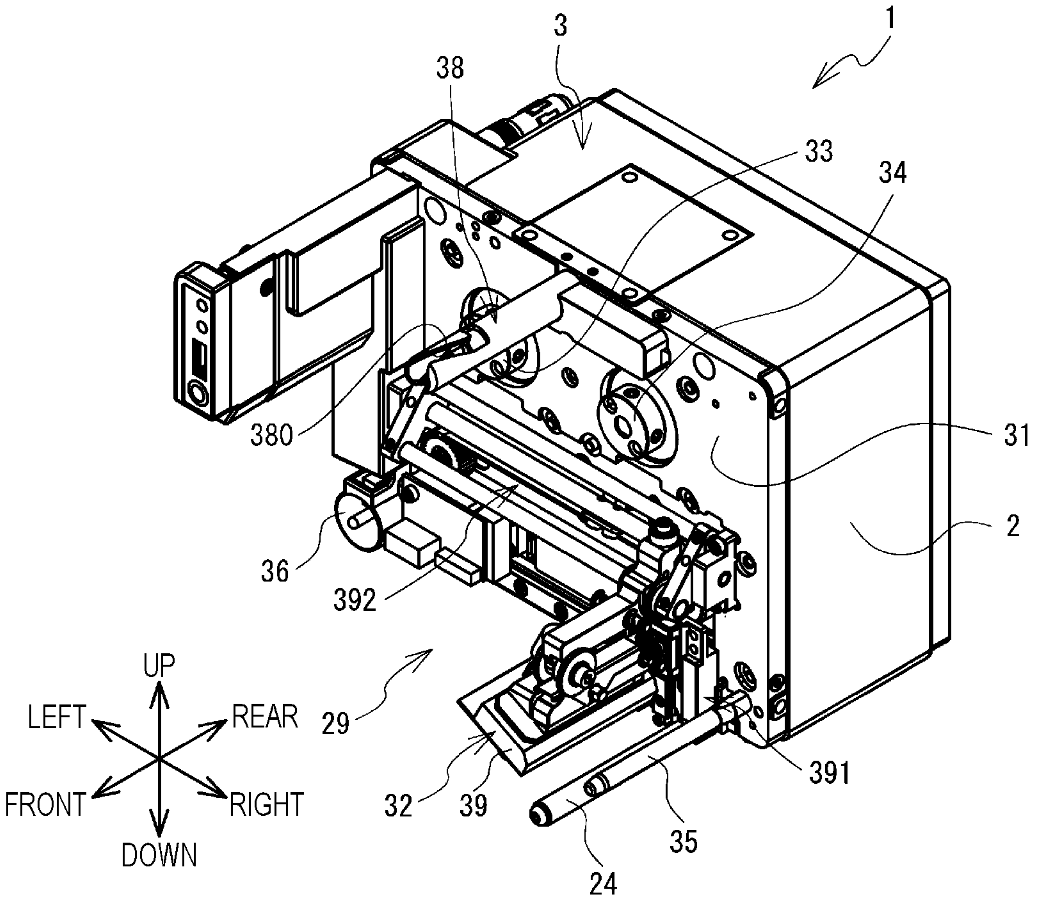
FIG. 3 is a perspective view showing a main body 3 of the printing device 1.

As shown in FIG. 1, the printing device 1 has a substantially rectangular parallelepiped shape. The printing device 1 includes a main body 3 and the cassette 4. The cassette 4 is detachably mounted to the main body 3 from a front side. The main body 3 includes a base plate 31 and housings 2 and 5. As shown in FIG. 3, the base plate 31 has a substantially rectangular plate shape. The housing 2 is provided at a rear side with respect to the base plate 31 (see FIG. 3). The housing 2 is formed with a rectangular opening that opens forward. The base plate 31 is fitted into the opening of the housing 2 from the front side. The housing 2 covers peripheries of motors 72A and 76 (see FIG. 5) which are provided at a rear side with respect to the base plate 31, a cassette motor (not shown), a control board, and the like.

Figure 2:
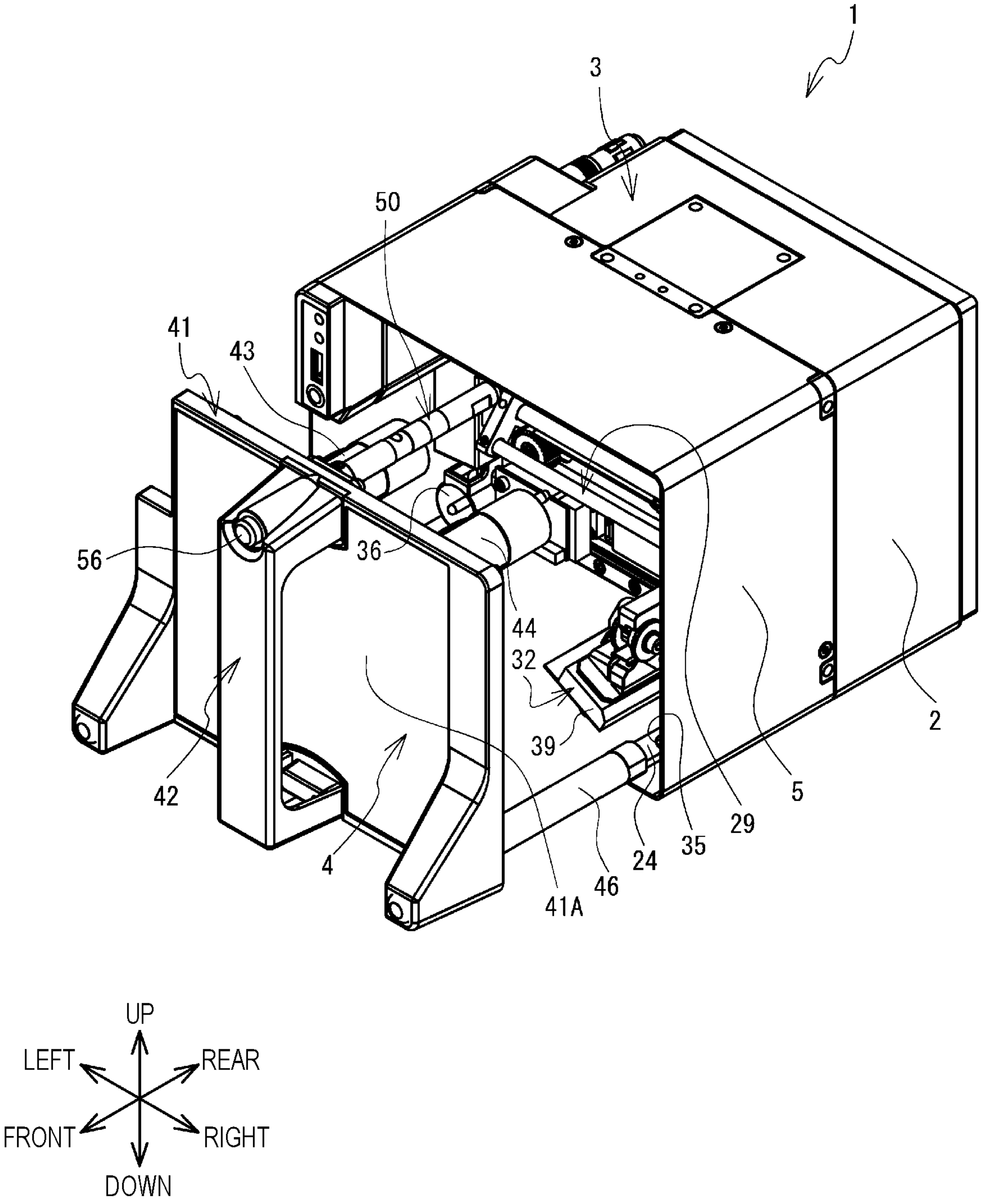
FIG. 2 is a perspective view of the printing device 1 in a case where a cassette 4 is removed.

As shown in FIGS. 1 and 2, the housing 5 is provided at a front side with respect to the base plate 31. The housing 5 is formed with a rectangular opening that opens to a front side of the housing 5. The opening at the front side of the housing 5 is covered with a cassette base 41, which will be described later, in a state where the cassette 4 is mounted to the printing device 1. Therefore, a lower side of the housing 5 is formed with an opening that opens downward. In FIG. 3, the housing 5 is omitted.

As shown in FIG. 3, a front surface of the base plate 31 is provided with a supply roll bearing portion 33, a take-up roll bearing portion 34, a support shaft 35, a bearing portion 36, a head moving mechanism 29, a head unit 32, and the like.

The supply roll bearing portion 33 is provided on an upper side with respect to a center of the base plate 31 in an up-down direction and on a left side with respect to a center of the base plate 31 in a left-right direction. The take-up roll bearing portion 34 is provided on the upper side with respect to the center of the base plate 31 in the up-down direction and on a right side with respect to the center of the base plate 31 in the left-right direction. The supply roll bearing portion 33 and the take-up roll bearing portion 34 each have a columnar shape (see FIG. 3), and are arranged in the left-right direction. The supply roll bearing portion 33 and the take-up roll bearing portion 34 are each rotated by driving of the cassette motor that is not shown provided at the rear side with respect to the base plate 31.

The support shaft 35 is provided on a lower right corner of the base plate 31. The support shaft 35 is formed in a columnar shape protruding forward. The bearing portion 36 is provided on a lower left corner of the base plate 31. The bearing portion 36 has a columnar shape. The bearing portion 36 has a recessed portion recessed rearward. A columnar support portion 38 extends from the vicinity of the supply roll bearing portion 33 toward the front side of the base plate 31. The support portion 38 is provided with a through hole 380. The through hole 380 extends forward from a mounting portion provided on the base plate 31. The head moving mechanism 29 and the head unit 32 will be described later.

Figure 4:
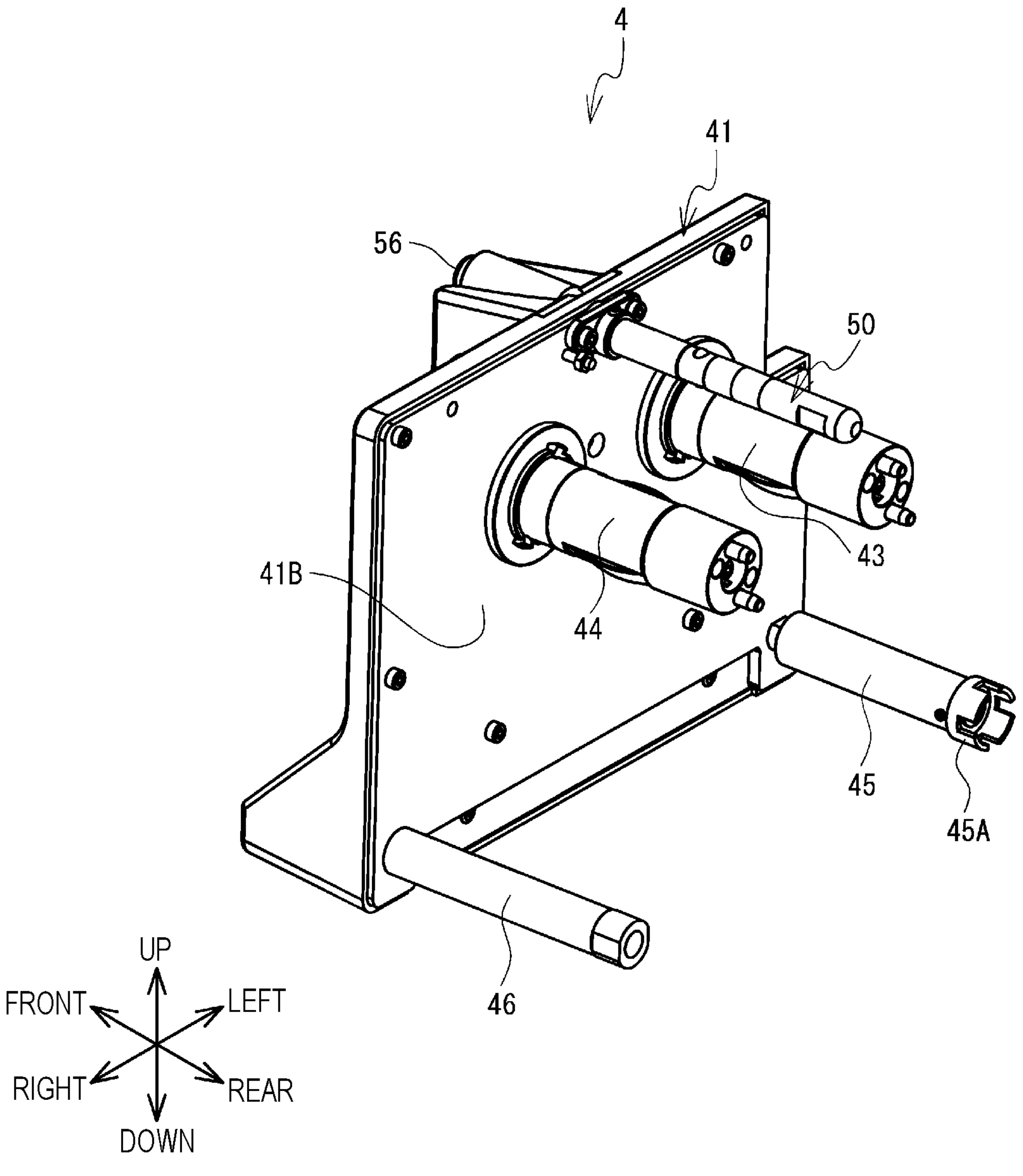
FIG. 4 is a perspective view of the cassette 4.

As shown in FIGS. 1 and 4, the cassette 4 includes the cassette base 41, a handle 42, a protruding portion 50, a supply roll shaft 43, a take-up roll shaft 44, and guide rollers 45 and 46. The cassette base 41 is a base portion having substantially square plate-shape. A front surface 41A and a rear surface 41B of the cassette base 41 have substantially the same shape as that of the opening at the front side of the housing 5 of the printing device 1.

The handle 42 is provided on a center of the front surface 41A of the cassette base 41 over upper and lower sides (see FIG. 1). A user grips the handle 42 of the cassette 4 on which the ink ribbon is supported, and slides the handle 42 rearward from a state of being disposed on a front side of the main body 3. Accordingly, the cassette 4 is inserted into the housing 5 through the opening at the front side of the housing 5.

In a case where the cassette 4 is mounted to the main body portion 3, the protruding portion 50 of the cassette 4 is engaged with the through hole 380 from the front. The user releases the engagement between the through hole 380 and the protruding portion 50 by pushing a release button 56 (see FIGS. 1 and 4) while gripping the handle 42. Accordingly, the user can remove the cassette 4 from the housing 5.

The supply roll shaft 43 is provided on an upper side with respect to a center of the rear surface 41B in an up-down direction and on a left side with respect to a center of the rear surface 41B in a left-right direction. The take-up roll shaft 44 is provided on the upper side with respect to the center of the rear surface 41B in the up-down direction and on a right side with respect to the center of the rear surface 41B in the left-right direction. The supply roll shaft 43 and the take-up roll shaft 44 are arranged in the left-right direction. The guide roller 45 is provided on a lower left corner of the rear surface 41B. The guide roller 46 is provided on a lower right corner of the rear surface 41B.

A cylindrical spool to which one end of the ink ribbon is connected is mounted to the take-up roll shaft 44. An unused ink ribbon is wound into a roll around the spool. A cylindrical spool to which the other end of the ink ribbon is connected is mounted to the supply roll shaft 43. The ink ribbon extending over the supply roll shaft 43 and the take-up roll shaft 44 is stretched between the guide roller 45 and the guide roller 46.

In a case where the cassette 4 is mounted to the main body 3, rear end portions of the supply roll shaft 43, the take-up roll shaft 44, the guide roller 45, and the guide roller 46 (see FIG. 4) of the cassette 4 can be engaged with the supply roll bearing portion 33, the take-up roll bearing portion 34, the bearing portion 36, and the support shaft 35, respectively. Specifically, the rear end portion of the supply roll shaft 43 is engaged with the supply roll bearing portion 33 (see FIG. 3). The rear end portion of the take-up roll shaft 44 is engaged with the take-up roll bearing portion 34 (see FIG. 3). An engaging portion 45A on a rear end of the guide roller 45 is engaged with the recessed portion of the bearing portion 36 (see FIG. 3). The support shaft 35 (see FIG. 3) is inserted into and engaged with the guide roller 46.

For example, the ink ribbon fed out from the spool mounted to the supply roll shaft 43 is conveyed obliquely downward to the left toward the guide roller 45. The ink ribbon comes into contact with a rotational body of the guide roller 45 to change its direction, and is conveyed rightward toward the guide roller 46. The ink ribbon comes into contact with a rotational body of the guide roller 46 to change its direction, and is conveyed obliquely upward to the left toward the spool mounted to the take-up roll shaft 44. In a case where the supply roll shaft 43 and the take-up roll shaft 44 are rotated by the cassette motor, the ink ribbon is fed out from a ribbon roll and taken up by the spool of the take-up roll shaft 44. In accordance with the conveyance of the ink ribbon, the rotational bodies of the guide rollers 45 and 46 rotate.

The head moving mechanism 29 and the head unit 32 will be described with reference to FIGS. 5 to 9. The head moving mechanism 29 is a mechanism for moving the head unit 32 including the thermal head 39 in the left-right direction and the up-down direction. The head moving mechanism 29 is provided below the center of the base plate 31 (see FIG. 3). The head moving mechanism 29 includes a head holding mechanism 48, a head left-right moving mechanism 391, and a head pressing mechanism 392.

Figure 5:
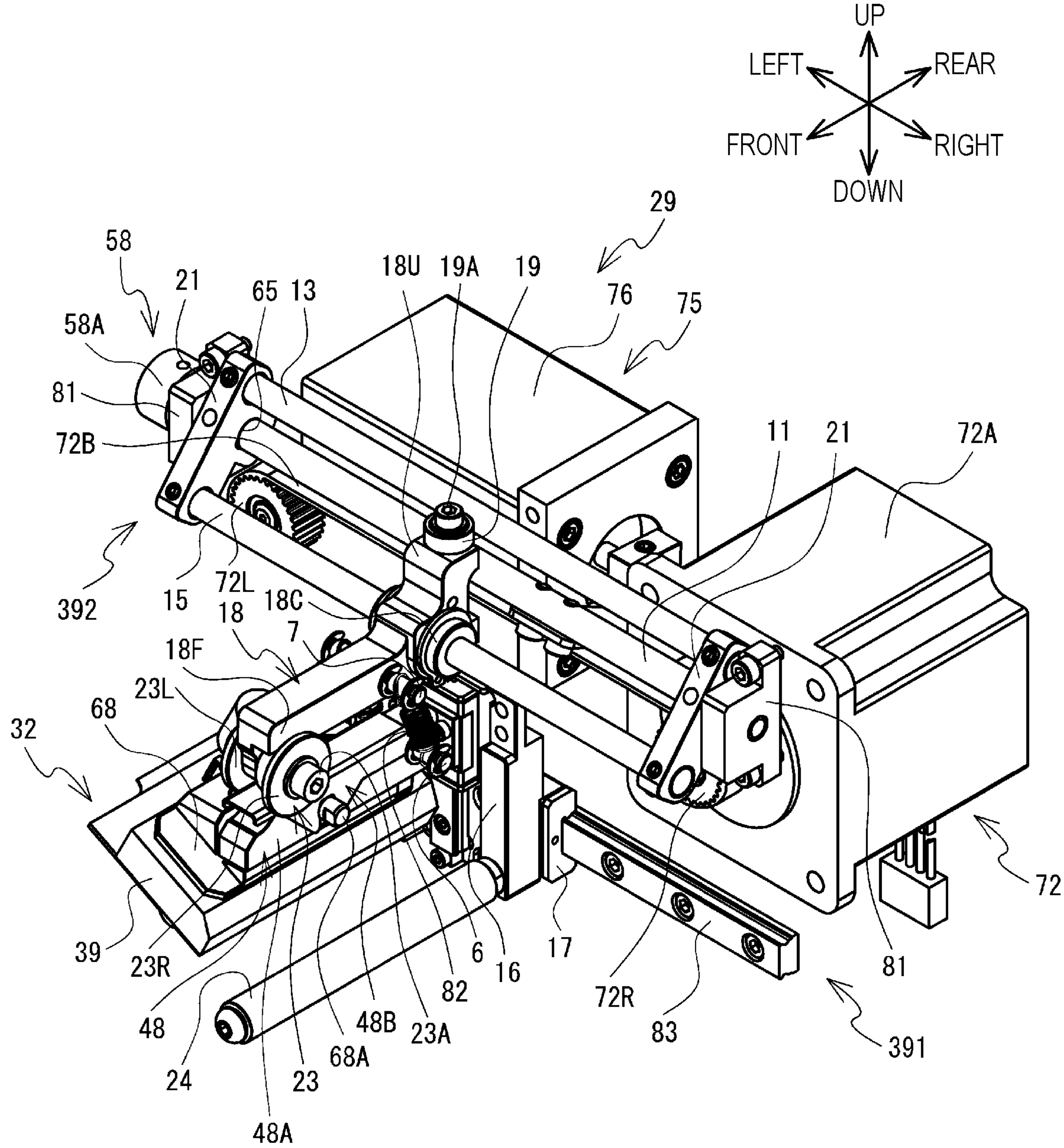
FIG. 5 is a perspective view of a head moving mechanism 29.

As shown in FIG. 5, the head holding mechanism 48 holds the head unit 32. The head holding mechanism 48 includes a guide rail 83, a guide member 17, a support portion 16, a head support portion 48A, an engaging member 48B, springs 82, and the like.

The guide rail 83 extends in the left-right direction and is fixed to a lower side of the base plate 31. The guide member 17 has a substantially rectangular parallelepiped shape. The guide member 17 has a recessed portion that is not shown on a rear surface of the guide member 17. The recessed portion is provided across the rear surface in the left-right direction. The recessed portion of the guide member 17 is engaged with the guide rail 83 to be movable in the left-right direction.

As shown in FIG. 5, the support portion 16 is formed in a substantially rectangular parallelepiped shape extending in the up-down direction. A rear side of a lower end portion of the support portion 16 is fixed to the guide member 17. The support portion 16 is fixed to the guide member 17, and thus is movable in the left-right direction together with the guide member 17. A front side of the support portion 16 has a pair of left and right groove portions that is not shown extending in the up-down direction.

As shown in FIG. 5, the head support portion 48A is formed in a substantially rectangular parallelepiped shape extending in a front-rear direction. A rear end portion of the head support portion 48A is engaged with the pair of left and right groove portions of the support portion 16 to be slidable in the up-down direction. The rear end portion of the head support portion 48A includes a pair of pins 6 protruding in left and right directions, respectively. The head support portion 48A has an insertion hole 49 (see FIG. 11) at a central portion of the head support portion 48A in the front-rear direction. The insertion hole 49 penetrates the head support portion 48A in the left-right direction. The engaging member 48B extending in the front-rear direction is formed in an inverted U-shape in a front view. A rear end portion of the engaging member 48B is pivotally supported by the pair of left and right pins 6 (see FIGS. 6 and 7). Therefore, the engaging member 48B is pivotable about an axis of the pair of left and right pins 6 (see FIG. 10).

Figure 6:
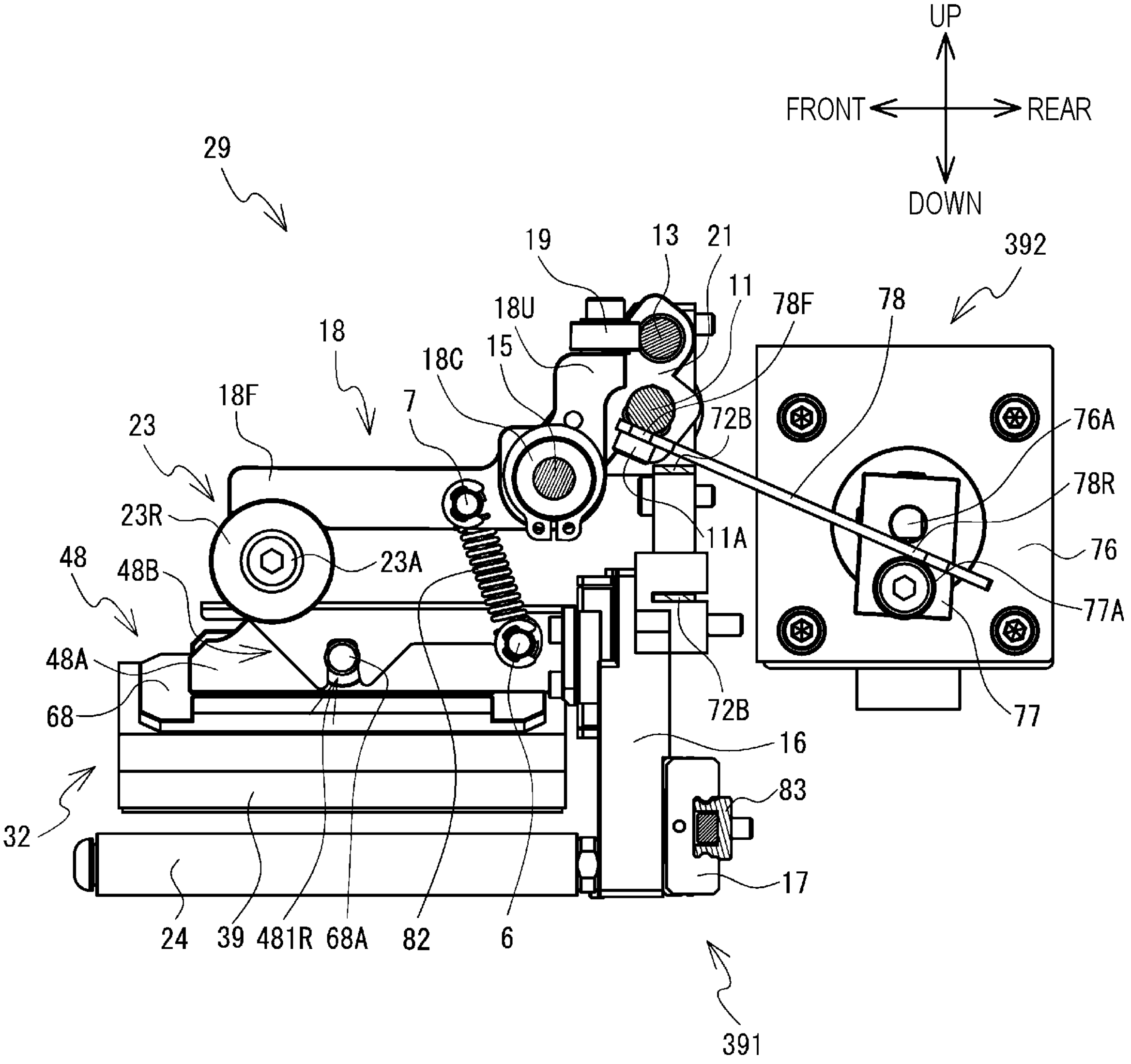
FIG. 6 is a right side view of the head moving mechanism 29 in a case where a thermal head 39 is at a retracted position.
Figure 7:
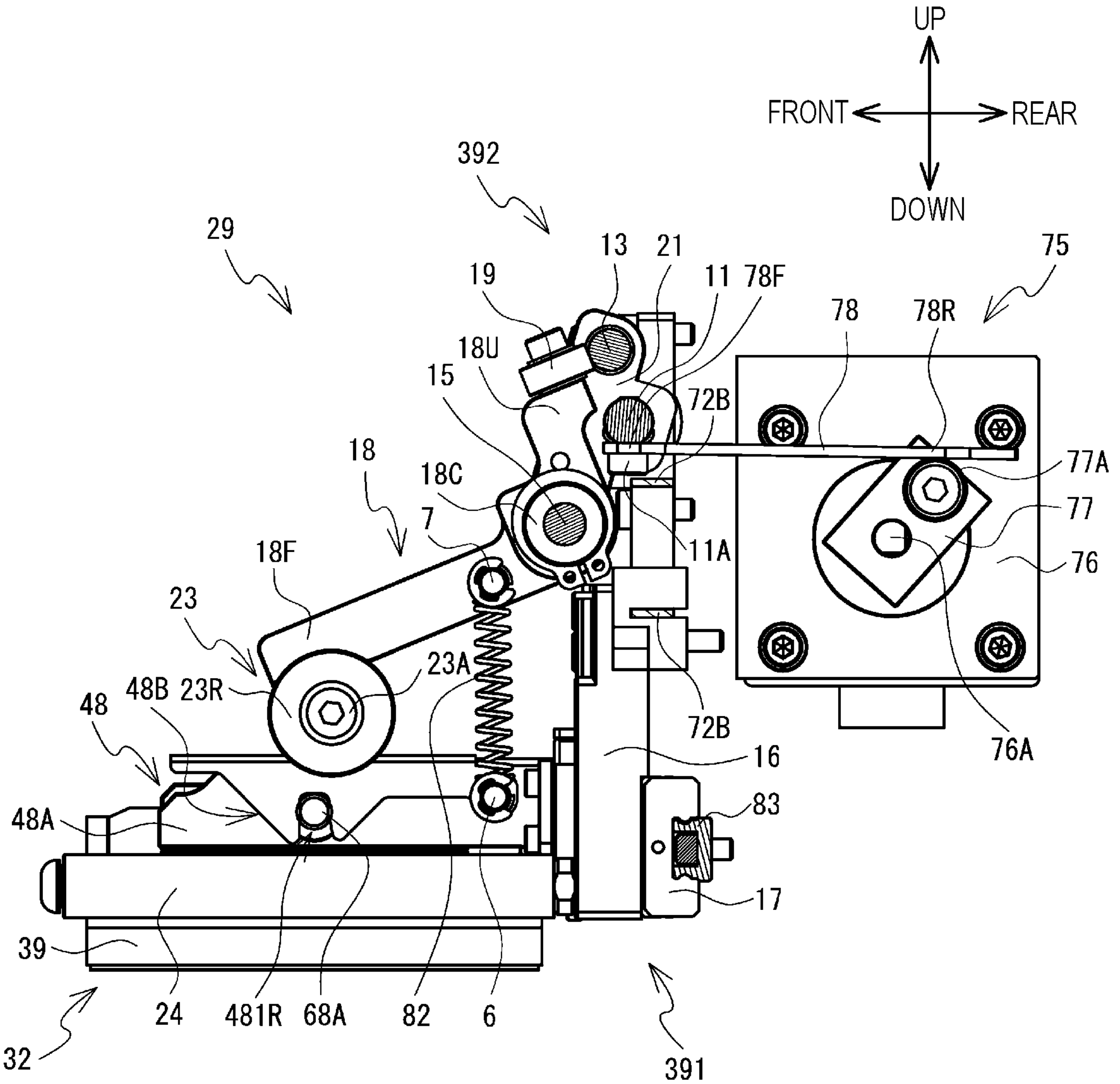
FIG. 7 is a right side view of the head moving mechanism 29 in a case where the thermal head 39 is at a printing position.
Figure 10:
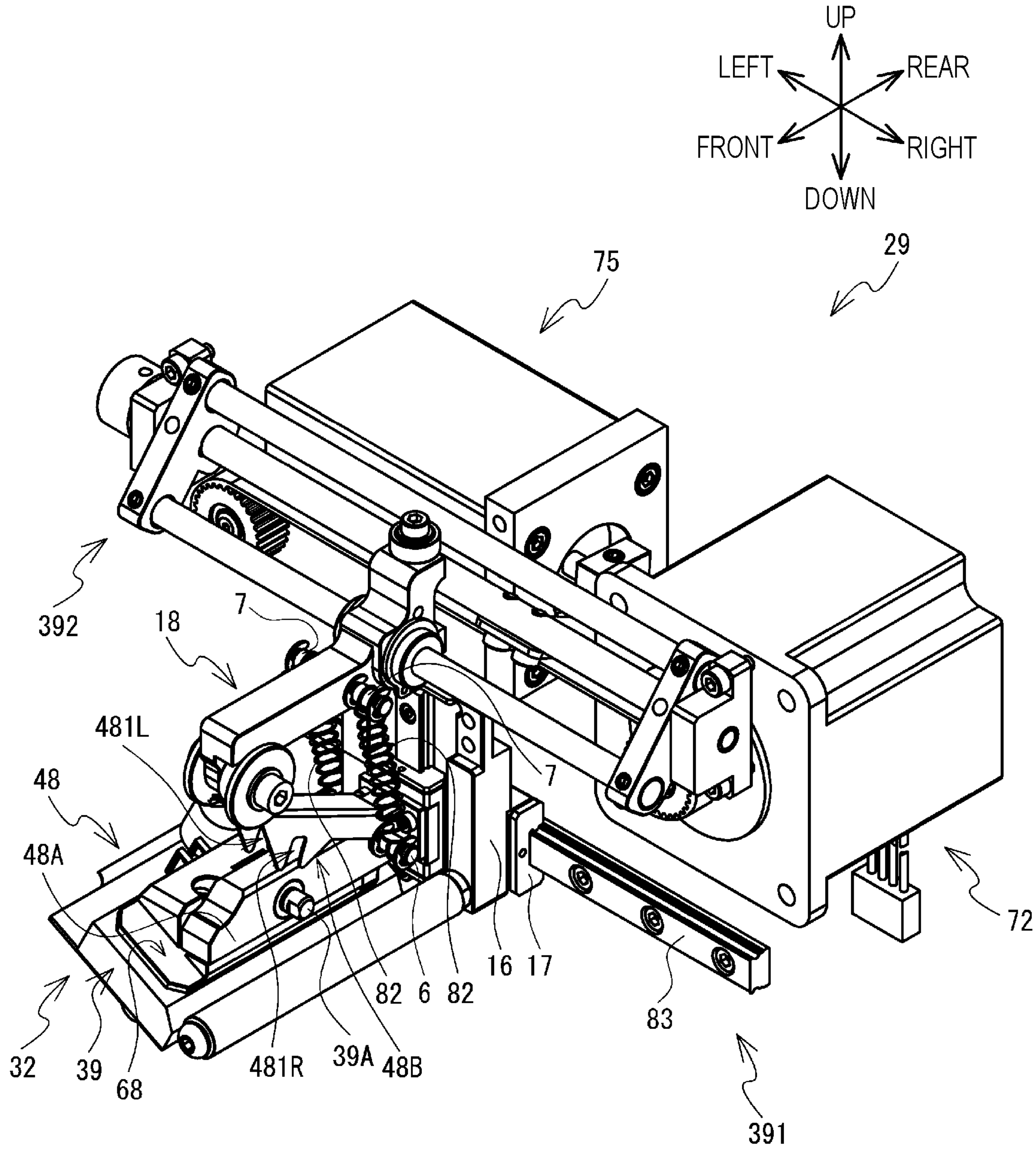
FIG. 10 is a perspective view of the head moving mechanism 29 in a case where an engaging member 48B pivots clockwise in a right side view.
Figure 11:
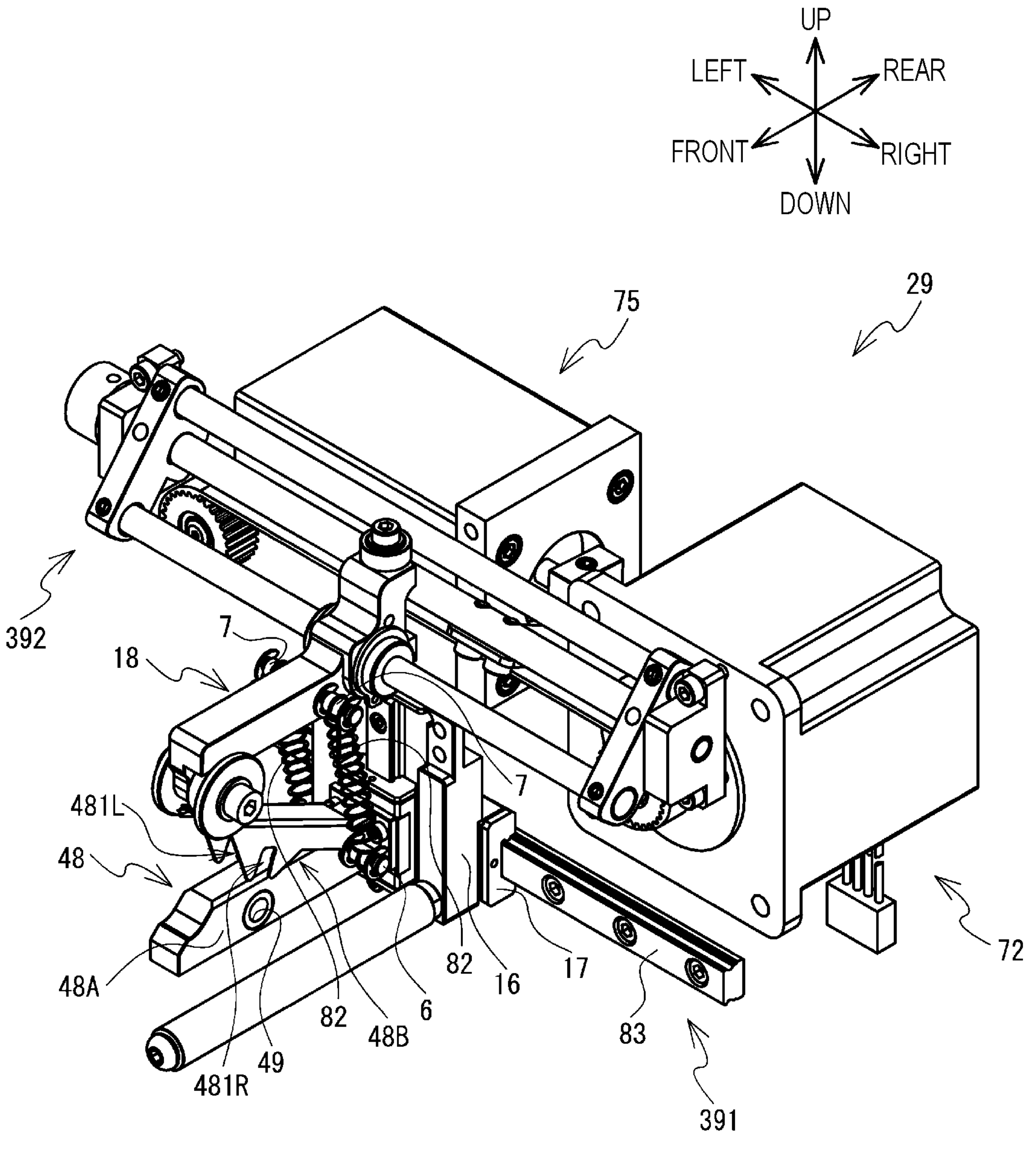
FIG. 11 is a perspective view of the head moving mechanism 29 in a case where the thermal head 39 is removed.

On a front side with respect to a center of the engaging member 48B in the front-rear direction, bifurcated claw portions 481R and 481L protruding downward from end portions in the left-right direction are provided (see FIGS. 10 and 11). As shown in FIGS. 5 to 7, the right bifurcated claw portion 481R is engaged with a right end portion of a protruding portion 68A of the head unit 32, which will be described later, to sandwich the right end portion in the front-rear direction. The left bifurcated claw portion 481L (see FIGS. 10 and 11) is engaged with a left end portion of the protruding portion 68A in the front-rear direction. Hereinafter, the engagement of the left and right bifurcated claw portions 481R and 481L with the right end portion and the left end portion of the protruding portion 68A, respectively, is also referred to as "engagement of the engaging member 48B with the protruding portion 68A".

As shown in FIGS. 5 to 7, the head unit 32 includes a head fixing portion 68 and the thermal head 39. The head fixing portion 68 is formed in a triangular prism shape extending in the front-rear direction. A right surface of the head fixing portion 68 faces the left bifurcated claw portion 481L. A lower surface of the head fixing portion 68 faces obliquely downward to the left.

The protruding portion 68A formed in a rod shape protrudes rightward from the right surface of the head fixing portion 68. The protruding portion 68A is inserted through the insertion hole 49 (see FIG. 11) of the head support portion 48A. The right end portion of the protruding portion 68A protrudes to a right side with respect to a right surface of the head support portion 48A. The head fixing portion 68 is fixed to the head holding mechanism 48 by engaging the engaging member 48B with the protruding portion 68A. In this case, the left bifurcated claw portion 481L is disposed between the head fixing portion 68 and the head support portion 48A. The right surface of the head fixing portion 68 and a left surface of the bifurcated claw portion 481L are in contact with each other, and thus a position of the head fixing portion 68 in the left-right direction is fixed. The protruding portion 68A is inserted through the insertion hole 49, and thus front, rear, upper, and lower positions of the head fixing portion 68 are fixed.

The thermal head 39 is fixed to the head fixing portion 68 with bolts that is not shown in a state where the lower surface of the head fixing portion 68 is in contact with an upper surface of the thermal head 39. Therefore, the thermal head 39 is held to be movable in an up-down direction while maintaining a predetermined angle. The thermal head 39 is exposed from the opening at the lower side of the housing 5.

Figure 8:
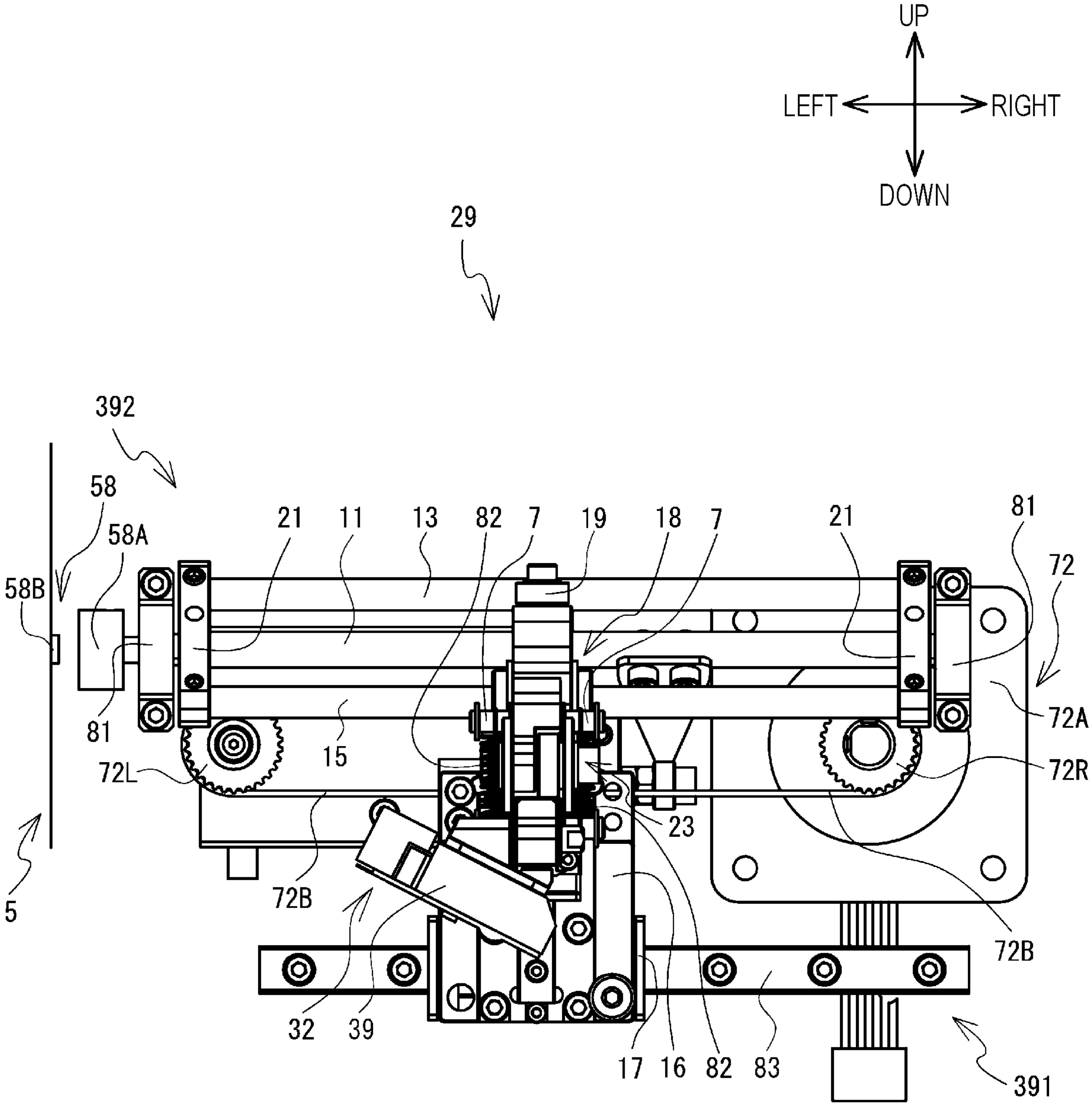
FIG. 8 is a front view of the head moving mechanism 29 in a case where the thermal head 39 is at the retracted position.
Figure 9:
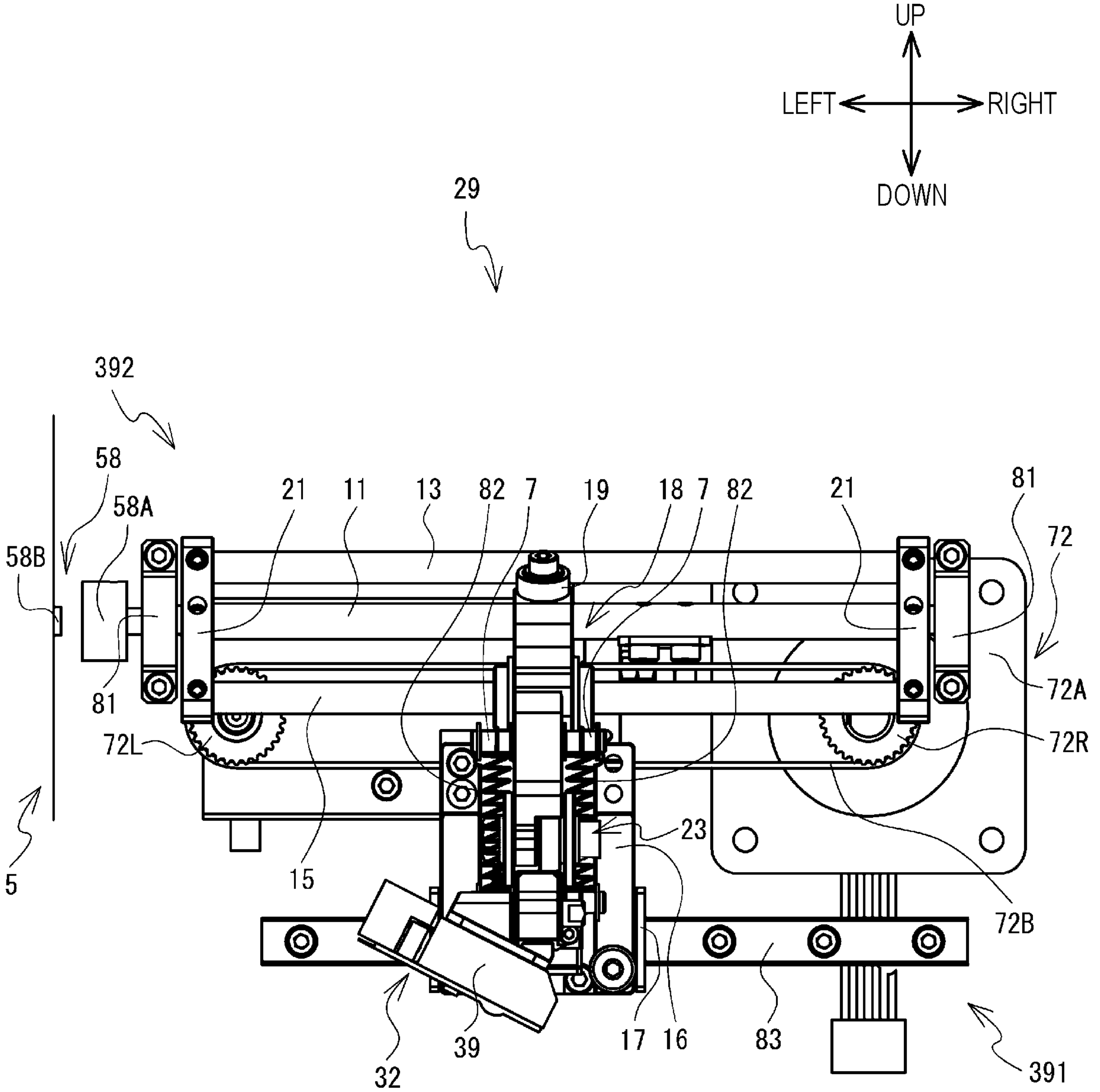
FIG. 9 is a front view of the head moving mechanism 29 in a case where the thermal head 39 is at the printing position.

As shown in FIGS. 5, 8, and 9, a movement drive portion 72 of the head left-right moving mechanism 391 includes the motor 72A, pulleys 72R and 72L, a belt 72B, and the like. The motor 72A is provided on the rear side with respect to the base plate 31 and on a rear side with respect to a right end portion of the guide rail 83. A shaft of the motor 72A extends forward. The pulley 72R is provided on the shaft of the motor 72A. The pulley 72R rotates together with rotation of the shaft of the motor 72A. The pulley 72L is rotatably provided on the front side and a left end portion with respect to the base plate 31. The pulley 72L is disposed at the same height as the shaft of the motor 72A in the up-down direction, that is, at the same height as the pulley 72R.

The belt 72B has an annular shape. The belt 72B is stretched over the pulleys 72L and 72R. The belt 72B rotates with rotation of the pulleys 72L and 72R. An upper end portion of the support portion 16 is fixed to a lower side of the belt 72B (see FIGS. 6 and 7). The head holding mechanism 48 is provided on the support portion 16, and thus the head holding mechanism 48 moves in the left-right direction in accordance with the rotation of the belt 72B. The head holding mechanism 48 holds the thermal head 39, and thus the thermal head 39 is also movable in the left-right direction.

The head pressing mechanism 392 includes a rotation shaft 11, a pair of shaft support portions 81, a pair of pivot members 21, a sliding shaft 13, a pressing shaft 15, an L-shaped member 18, the springs 82, a rotation drive portion 75, a sensor 58, and the like. The rotation shaft 11 extends in the left-right direction. The pair of shaft support portions 81 are separated from each other in the left-right direction. The left shaft support portion 81 rotatably supports a left end portion of the rotation shaft 11. The right shaft support portion 81 rotatably supports a right end portion of the rotation shaft 11. The pair of shaft support portions 81 are arranged above the support portion 16. The pair of shaft support portions 81 are fixed to an upper side of the base plate 31. The rotation shaft 11 rotates in a state of being fixed by the pair of shaft support portions 81.

The pair of pivot members 21 are separated from each other in the left-right direction. Each of the pair of pivot members 21 is formed in a plate shape extending in the up-down direction. The left pivot member 21 is disposed on a right side of the left shaft support portion 81. The right pivot member 21 is disposed on a left side of the right shaft support portion 81. Each of the pair of pivot members 21 has a through hole 65 (see FIG. 5), at a substantially center of each of the pair of pivot members 21, penetrating in the left-right direction. The rotation shaft 11 is fixed in a state of being inserted through the through hole 65. The pair of pivot members 21 pivot integrally with the rotation shaft 11 around the rotation shaft 11.

The sliding shaft 13 extends in the left-right direction. A left end of the sliding shaft 13 is fixed to an upper end portion of the left pivot member 21. A right end of the sliding shaft 13 is fixed to an upper end portion of the right pivot member 21. The sliding shaft 13 is provided above the rotation shaft 11. The pressing shaft 15 extends in the left-right direction. A left end of the pressing shaft 15 is fixed to a lower end portion of the left pivot member 21. A right end of the pressing shaft 15 is fixed to a lower end portion of the right pivot member 21. The pressing shaft 15 is provided below the rotation shaft 11. The sliding shaft 13 and the pressing shaft 15 pivot integrally with the rotation shaft 11 around the rotation shaft 11.

As shown in FIGS. 5 to 7, the L-shaped member 18 is formed in an inverted L-shape in a right side view. The L-shaped member 18 includes a central portion 18C, an upper end portion 18U, and a front end portion 18F. The upper end portion 18U extends upward from an upper portion of the central portion 18C. The front end portion 18F extends forward from a front portion of the central portion 18C. The central portion 18C is pivotally supported by the pressing shaft 15 to be movable in the left-right direction along the pressing shaft 15 and pivotable about the pressing shaft 15. The front portion of the central portion 18C includes a pair of pins 7 protruding in left and right directions, respectively.

As shown in FIGS. 6 and 7, the upper end portion 18U of the L-shaped member 18 is located above the rotation shaft 11. The upper end portion 18U is provided with a shaft portion 19A (see FIG. 5) extending upward. The shaft portion 19A rotatably supports a sliding roller 19. The sliding roller 19 comes into contact with the sliding shaft 13 from the front and slides in the left-right direction.

A pressing roller 23 is provided on a lower side of the front end portion 18F of the L-shaped member 18. The pressing roller 23 includes a shaft portion 23A, a right wheel portion 23R, and a left wheel portion 23L. The shaft portion 23A extends in the left-right direction and is pivotally supported on the lower side of the front end portion 18F of the L-shaped member 18. The right wheel portion 23R is formed in a substantially circular shape in a side view, and is fixed to a right end of the shaft portion 23A. The left wheel portion 23L is formed in a substantially circular shape in a side view, and is fixed to a left side of the shaft portion 23A. The right wheel portion 23R and the left wheel portion 23L rotate about the shaft portion 23A. The pressing roller 23 is in contact, to be slidable, with an upper surface of the engaging member 48B of the head holding mechanism 48. The right wheel portion 23R and the left wheel portion 23L of the pressing roller 23 sandwich a front end portion of the engaging member 48B in the left-right direction. Therefore, the L-shaped member 18 moves in the left-right direction in conjunction with movement of the head unit 32 in the left-right direction.

As shown in FIGS. 8 and 9, a pair of springs 82 are separated from each other in the left-right direction. An upper end portion of the right spring 82 is attached to the right pin 7 of the L-shaped member 18 (see FIGS. 6 and 7). A lower end portion of the right spring 82 is attached to the right pin 6 of the head support portion 48A. An upper end portion of the left spring 82 is attached to the left pin 7 of the L-shaped member 18 (see FIG. 8). A lower end portion of the left spring 82 is attached to the pin 6 of the head support portion 48A. The pair of left and right springs 82 bias the head unit 32 upward. In this case, the thermal head 39 is disposed at a retracted position (see FIGS. 6 and 8) separated from the ink ribbon.

The rotation drive portion 75 includes a motor 76, a cam support portion 77, a cam follower 77A, a plate spring 78, and the like (see FIGS. 6 and 7). The motor 76 is disposed on the rear side with respect to the base plate 31 and on a left side with respect to the motor 72A. The cam support portion 77 is a substantially rectangular plate member extending in the up-down and front-rear directions. One end portion of the cam support portion 77 is fixed to a drive shaft 76A of the motor 76 extending parallel to the left-right direction. The cam follower 77A is provided on the other end portion of the cam support portion 77. The cam follower 77A is formed in a substantially columnar shape extending in the left-right direction. The cam follower 77A rotates around the drive shaft 76A together with the cam support portion 77. A rear end portion 78R of the plate spring 78 is connected to the cam follower 77A. A front end portion 78F of the plate spring 78 is fastened to the rotation shaft 11 from below with a bolt 11A.

The sensor 58 includes a magnetic member 58A and a Hall sensor 58B (see FIGS. 8 and 9). The magnetic member 58A is attached to a left end portion of the rotation shaft 11. The Hall sensor 58B is provided in the housing 5. The Hall sensor 58B faces a left side of the magnetic member 58A. The Hall sensor 58B detects a change in a magnetic flux density of the magnetic member 58A that changes in accordance with the rotation of the rotation shaft 11. The Hall sensor 58B detects a rotational position of the rotation shaft 11 based on the detected change in the magnetic flux density.

The pressing for the thermal head 39 will be described. In the printing device 1, the cam follower 77A rotates about the drive shaft 76A in accordance with rotation of the motor 76. As the cam follower 77A rotates, the rear end portion 78R of the plate spring 78 moves in the up-down direction together with the cam follower 77A of the cam support portion 77 (see FIGS. 6 and 7). Accordingly, an inclination angle of the plate spring 78 about the rotation shaft 11 changes. That is, in a case where the cam follower 77A moves downward due to the rotation of the cam support portion 77 (see FIG. 6), the inclination angle of the plate spring 78 from the front end portion 78F to the rear end portion 78R increases. In a case where the cam follower 77A moves upward due to the rotation of the cam support portion 77 (see FIG. 7), the inclination angle of the plate spring 78 from the front end portion 78F to the rear end portion 78R becomes small. As the inclination angle changes, a position of the front end portion 78F changes. Accordingly, the rotation shaft 11 rotates.

In a case where the drive shaft 76A of the motor 76 moves in a clockwise direction in a right side view (see FIG. 6), the cam support portion 77 rotates in the clockwise direction in the right side view. In a case where the cam follower 77A moves downward, the inclination angle of the plate spring 78 increases. At this time, the front end portion 78F moves forward and upward. The rotation shaft 11 rotates in the clockwise direction in the right side view. Accordingly, the pivot member 21 pivots about the rotation shaft 11 in the clockwise direction in the right side view. Therefore, the sliding shaft 13 pivots clockwise in the right side view together with the pivot member 21. At this time, the L-shaped member 18 moves the thermal head 39 upward with a biasing force of the pair of left and right springs 82. Therefore, the thermal head 39 is disposed at the retracted position where the thermal head 39 is separated from the ink ribbon.

In a case where the motor 76 moves in a counterclockwise direction in the right side view from a state shown in FIG. 6 (see FIG. 7), the cam follower 77A rotates in the counterclockwise direction in the right side view. When the cam follower 77A moves upward, the inclination angle of the plate spring 78 decreases. At this time, the front end portion 78F moves rearward and downward. In this case, the rotation shaft 11 rotates in the counterclockwise direction in the right side view. Accordingly, the pivot member 21 pivots about the rotation shaft 11 in the counterclockwise direction in the right side view. Therefore, the sliding shaft 13 rotates counterclockwise in the right side view about an axis of the rotation shaft 11. At this time, the sliding roller 19 of the L-shaped member 18 pivots counterclockwise in the right side view about the rotation shaft 11 together with the sliding shaft 13.

In a case where the sliding roller 19 pivots counterclockwise in the right side view, the L-shaped member 18 pivots counterclockwise in the right side view about the pressing shaft 15. Therefore, the pressing roller 23 provided on the front end portion 18F moves downward while pivoting about the pressing shaft 15 in the counterclockwise direction in the right side view. Due to the downward movement of the pressing roller 23, the engaging member 48B of the head holding mechanism 48 is pressed downward against the upward biasing force of the springs 82. At this time, the head support portion 48A slides downward with respect to the support portion 16 together with the head unit 32. Therefore, the head unit 32 is pressed downward. Accordingly, the thermal head 39 moves to a printing position where printing can be performed on the printing medium (see FIGS. 7 and 9).

At the time of performing the printing, the ink ribbon is fed out from the ribbon roll of the supply roll shaft 43 and conveyed in the cassette 4. The fed ink ribbon moves between the guide roller 45 and the guide roller 46. The thermal head 39 is moved up, down, left, and right by the head moving mechanism 29 to move from the retracted position (see FIGS. 6 and 8) to the printing position (see FIGS. 7 and 9). The thermal head 39 at the printing position heats a portion of the fed ink ribbon stretched between the guide roller 45 and the guide roller 46. In a case where an ink of the ink ribbon is heated, the ink is transferred to a packaging material disposed on a lower side with respect to the printing device 1 by the platen of the packaging machine that is not shown. The heated ink ribbon is taken up by the spool of the take-up roll shaft 44.

As described above, the thermal head 39 moves in the up-down direction in conjunction with the rotation of the rotation shaft 11. The printing device 1 can detect the rotational position of the rotation shaft 11 by the sensor 58. That is, the rotational position of the rotation shaft 11 and a position of the thermal head 39 in the up-down direction correspond to each other, and thus the printing device 1 can specify the position of the thermal head 39 in the up-down direction from a detection result of the rotational position of the rotation shaft 11. For example, in a case where a surface of the platen comes into contact with a lower surface of the thermal head 39, the printing device 1 can detect the position of the thermal head 39 in the up-down direction as a position of the platen in the up-down direction.

Replacement of the head unit 32 will be described with reference to FIGS. 10 and 11. At the time of replacing the head unit 32, the user operates the printing device 1 to move the head unit 32 upward using the head pressing mechanism 392. Accordingly, the thermal head 39 is moved to the retracted position. The user pivots the engaging member 48B counterclockwise in the right side view about the axis of the pins 6. Accordingly, the engagement of the engaging member 48B with the protruding portion 68A is released (see FIG. 10). At this time, the user moves the head unit 32 leftward. Accordingly, the user can remove the head unit 32 from the head holding mechanism 48.

Next, the user inserts a protruding portion 68A of a new head unit 32 through the insertion hole 49 of the head support portion 48A. The user pivots the engaging member 48B clockwise in the right side view to engage the engaging member 48B with the protruding portion 68A inserted through the insertion hole 49. Accordingly, the replacement of the head unit 32 by the user is completed.

As described above, in the printing device 1, the rotation shaft 11 and the pressing shaft 15 are separately provided. Therefore, the printing device 1 can move the thermal head 39 without limiting a movable range of the thermal head 39 in the left-right direction, as compared with a case where the thermal head 39 is provided on the rotation shaft 11, moves in the left-right direction on the rotation shaft 11, and is pressed downward due to the rotation of the rotation shaft 11. Therefore, the printing device 1 can increase a movable range of the thermal head 39.

The sensor 58 can detect the rotational position of the rotation shaft 11. Therefore, the printing device 1 can accurately detect the position of the thermal head 39 in the up-down direction by detecting the rotational position of the rotation shaft 11 by the sensor 58.

The rotation drive portion 75 includes the motor 76, the cam support portion 77, the cam follower 77A, and the plate spring 78. The cam support portion 77 is provided on the drive shaft 76A of the motor 76 extending parallel to the left-right direction. The rear end portion 78R of the plate spring 78 is connected to the cam follower 77A, and the front end portion 78F of the plate spring 78 is fixed to the rotation shaft 11. In the printing device 1, the cam follower 77A rotates in accordance with the rotation of the motor 76. As the cam follower 77A rotates, the rear end portion 78R of the plate spring 78 moves in the up-down direction together with the cam follower 77A. Therefore, the front end portion 78F of the plate spring 78 moves the rotation shaft 11 in a direction in which the rotation shaft 11 rotates, in accordance with the inclination angle of the plate spring 78. Therefore, the rotation shaft 11 can rotate. In the printing device 1, the rotation drive portion 75 can be implemented by the motor 76, the cam follower 77A, and the plate spring 78 at low cost.

The head holding mechanism 48 holds the thermal head 39 from above. The support portion 16 supports the head holding mechanism 48 to be movable in the up-down direction. The pressing roller 23 presses the head holding mechanism 48 from above to below. Therefore, the pressing roller 23 can press the thermal head 39 downward via the head holding mechanism 48.

The thermal head 39 is detachably attached to the head holding mechanism 48. The thermal head 39 includes the protruding portion 68A protruding rightward. The head holding mechanism 48 includes the head support portion 48A and the engaging member 48B. The head support portion 48A has the insertion hole 49 penetrating in the left-right direction through which the protruding portion 68A is allowed to be inserted in a case where the thermal head 39 is mounted to the head holding mechanism 48. The engaging member 48B is engaged with the protruding portion 68A in a state where the protruding portion 68A is inserted through the insertion hole 49 of the head support portion 48A. In the printing device 1, the thermal head 39 is detachably attached to the head holding mechanism 48. In the head holding mechanism 48, the engaging member 48B is engaged with the protruding portion 68A in a state where the protruding portion 68A is inserted through the insertion hole 49 of the head support portion 48A. Therefore, the thermal head 39 can be reliably fixed. Therefore, the user can easily replace the thermal head 39.

The present invention is not limited to the above embodiment, and various modifications are possible. The support portion 16 may directly hold the thermal head 39 to be movable in the up-down direction without using the head holding mechanism 48. In this case, the head unit 32 may not include the head fixing portion 68. The head unit 32 may be non-replaceable. The L-shaped member 18 has an L-shape, but may be a member extending in an up-down direction. Only one of the pair of springs 82 may be provided. Instead of the sliding roller 19, a member that slides along the sliding shaft 13 may be provided. Instead of the pressing roller 23, a member capable of pressing the thermal head 39 may be provided. This member has a structure that converts a force for pivoting the sliding shaft 13 into a force for pressing the head unit 32 downward.

The sensor 58 is not limited to the magnetic member 58A and the Hall sensor 58B. For example, the rotational position of the motor 76 may be detected by an encoder, and the position of the thermal head 39 may be detected using information on the rotational position of the motor 76.

The rotation drive portion 75 is implemented by the motor 76, the cam follower 77A, and the plate spring 78, but may be configured to rotate the rotation shaft 11 with a gear or the like. In such a case, a movable distance of the head in the left-right direction can also be set to be wide regardless of a length of the rotation shaft 11, the gear, and the like. The plate spring 78 may be a plate.

The configuration of the head holding mechanism 48 is not limited to the above configuration, and may be any configuration as long as the thermal head 39 can be pressed downward.

The head holding mechanism 48 is engaged with the protruding portion 68A with the left and right bifurcated claw portions 481L and 481R, but may be engaged with the protruding portion 68A with one side alone. The head holding mechanism 48 may be engaged with the protruding portion 68A by being fixed to a tip end portion of the protruding portion 68A with a nut or the like. In an example, a form in which the printing device 1 is installed and used to perform printing on a lower surface has been described, but a printing surface can be freely changed by changing an installation form. For example, it is also possible to use the printing device 1 in such a manner that the printing device 1 is installed sideways and performs printing on a side surface (vertical surface).

What is claimed is:

1. A printing device comprising:

a thermal head;

a rotation shaft extending in an axial direction and rotatably supported;

a rotation drive portion configured to rotate the rotation shaft;

a pivot member connected to the rotation shaft and configured to pivot integrally with the rotation shaft about the rotation shaft;

a first support portion configured to support the thermal head to be movable in an up-down direction intersecting the axial direction;

a second support portion configured to support the first support portion to be movable parallel to the axial direction;

a biasing unit configured to bias the thermal head upward;

a first pivot shaft supported by the pivot member, extending parallel to the axial direction, located below the rotation shaft, and configured to pivot integrally with the pivot member about the rotation shaft;

a support member supported by the first pivot shaft to be movable along the first pivot shaft and to be pivotable about the first pivot shaft, the support member including an upper end portion located above the rotation shaft, a lower end portion located below the rotation shaft, and an intermediate portion located between the upper end portion and the lower end portion;

a pressing portion provided on the lower end portion of the support member and configured to press the thermal head downward; and a movement drive portion configured to move the first support portion in the axial direction.

2. The printing device according to claim 1, further comprising:

a second pivot shaft supported by the pivot member, extending parallel to the axial direction, located above the rotation shaft, and configured to pivot integrally with the pivot member about the rotation shaft; and a sliding member provided on the upper end portion of the support member, configured to come into contact with the second pivot shaft, and configured to slide along the axial direction.

3. The printing device according to claim 1, further comprising:

a sensor configured to detect a rotational position of the rotation shaft.

4. The printing device according to claim 1, wherein the rotation drive portion includes:

a motor;

a cam provided on a drive shaft of the motor, the drive shaft extending parallel to the axial direction; and a plate-shaped member including one end portion connected to the cam and an other end portion fixed to the rotation shaft.

5. The printing device according to claim 1, further comprising:

a head holding member configured to hold the thermal head from above, wherein the first support portion is configured to support the head holding member to be movable in the up-down direction, and the pressing portion is configured to press the head holding member from above to below.

6. The printing device according to claim 5, wherein the thermal head is attachable to and detachable from the head holding member and includes an engaged portion protruding to one side in the axial direction, and the head holding member includes:

a third support portion having an insertion hole, penetrating in the axial direction, through which the engaged portion is configured to be inserted in a case where the thermal head is mounted to the head holding member; and an engaging member configured to engage with the engaged portion in a state where the engaged portion is inserted through the insertion hole of the third support portion.

7. The printing device according to claim 5, wherein the support member is supported, by the first pivot shaft, at the intermediate portion.

8. A printing device comprising:

a thermal head;

a rotation shaft extending in an axial direction and supported rotatably around an axis of the rotation shaft;

a rotation drive portion configured to rotate the rotation shaft;

a pivot member connected to the rotation shaft and configured to pivot integrally with the rotation shaft about the rotation shaft;

a first support portion configured to support the thermal head to be movable on one side in an intersecting direction with respect to the pivot member, the intersecting direction intersecting with the axial direction;

a second support portion configured to support the first support portion to be movable parallel to the axial direction;

a biasing unit configured to bias the thermal head to an other side in the intersecting direction;

a first pivot shaft supported by the pivot member, extending parallel to the axial direction, located on the one side in the intersecting direction than the rotation shaft, and configured to pivot integrally with the pivot member about the rotation shaft;

a support member supported to be movable along the first pivot shaft and to be pivotable about the first pivot shaft, the support member including a first end portion located on the other side in the intersecting direction than the rotation shaft, a second end portion located on the one side than the rotation shaft, and an intermediate portion located between the first end portion and the second end portion;

a pressing portion provided on the second end portion of the support member and configured to press the thermal head toward the one side in the intersecting direction; and a movement drive portion configured to move the first support portion in the axial direction.

* * * * *